(12) United States Patent
McGarvey (10) Patent No.: US 11,520,136 B2
(45) Date of Patent: Dec. 6, 2022

(54) HANDS-FREE ADJUSTABLE MAGNIFYING LENS HOLDER AND WORKSTATION

(71) Applicant: Michael W McGarvey, Noblesville, IN (US)

(72) Inventor: Michael W McGarvey, Noblesville, IN (US)

( * ) Notice: Subject to any disclaimer, the term of this patent is extended or adjusted under 35 U.S.C. 154(b) by 161 days.

(21) Appl. No.: 17/127,535

(22) Filed: Dec. 18, 2020

(65) Prior Publication Data

US 2021/0191103 A1    Jun. 24, 2021

Related U.S. Application Data

(60) Provisional application No. 62/950,212, filed on Dec. 19, 2019.

(51) Int. Cl.
*G02B 27/02* (2006.01)
*G02B 25/00* (2006.01)
*G02B 7/02* (2021.01)

(52) U.S. Cl.
CPC ......... *G02B 25/005* (2013.01); *G02B 25/008* (2013.01); *G02B 7/021* (2013.01)

(58) Field of Classification Search
CPC ..... G02B 25/005; G02B 25/008; G02B 7/021
USPC ....................................................... 359/802
See application file for complete search history.

(56) References Cited

U.S. PATENT DOCUMENTS

| 4,496,127 | A | 1/1985 | Nelson |
| 4,552,382 | A | 11/1985 | Cowden |
| 6,574,051 | B1 | 6/2003 | Powell |
| 7,304,809 | B1 | 12/2007 | Budacz |
| 7,452,094 | B1 | 11/2008 | Kroon et al. |
| 8,416,513 | B1 * | 4/2013 | McPherson ............ A47B 23/00 248/446 |
| 2004/0150985 | A1 | 8/2004 | Larocque |

FOREIGN PATENT DOCUMENTS

| CN | 101382650 B | 6/2011 |
| CN | 101762874 B | 5/2012 |
| CN | 20406552 U | 12/2014 |
| CN | 204496101 U | 7/2015 |
| CN | 104765141 A | 12/2018 |

* cited by examiner

*Primary Examiner* — William Choi
(74) *Attorney, Agent, or Firm* — Ritchison Law Offices, PC; John D Ritchison

(57) ABSTRACT

A hands-free adjustable magnifying lens holder and workstation for use with up-close handiwork and reading made as a frame base with short and long side members pivotally supporting a frame with multiple lenses and a component to releasably hold the frame of the lenses at various angles for use. The device can magnify, can easily adjust heights and angle of lens, can be collapsed to a compact package, can use multiple lens for increased magnification, is light weight and easy to carry, requires no tools to adjust positions, and can be manufactured from available materials.

16 Claims, 10 Drawing Sheets

HANDS-FREE ADJUSTABLE MAGNIFYING LENS HOLDER AND WORKSTATION

CROSS-REFERENCE TO RELATED APPLICATIONS

This application claims the benefit of U.S. Provisional Patent Application with Ser. No. 62/950,212 filed Dec. 19, 2019, by Michael W. McGarvey. The application was entitled "Hands-free adjustable magnifying lens holder and work station".

FIELD OF INVENTION

This invention relates to a Hands-free adjustable magnifying lens holder and workstation. Particularly this relates generally to stands used to support an object in an elevated, flat or angled position upon a table or other supporting surface and one that is easily adjustable to account for materials different thicknesses and which magnifies the object or space appearing upon the exposed area of the object or workspace.

This invention relates generally to magnifying lenses and, more particularly, to a portable, free-standing magnifying lens particularly adapted for aiding in magnification with flat sheet lens. This magnifying lens holder and workstation device relates to magnification devices and, more particularly, to a magnification screen for books, photography, workstations, and fine printed items for assisting a user to read text or see the detail of images at a workstation. Consequently, a need has been felt for providing an apparatus which provides portable magnification in a manner that can be used in a free-standing, non-hand-held manner.

FEDERALLY SPONSORED RESEARCH

None.

SEQUENCE LISTING OR PROGRAM

None.

BACKGROUND—FIELD OF INVENTION and PRIOR ART

This section is not Applicable to Provisional Applications. However, as far as known, there are no Hands-free adjustable magnifying lens holder and workstation or the like. It is believed that this product is unique in its design and technologies.

BACKGROUND

This background as to Hands-free adjustable magnifying lens holder and workstation should be useful. Those with impaired vision when viewing printed material or objects at an "up-close" position, often rely on portable magnifiers to aid in our viewing duties. While these magnifiers certainly work, they require the user to hold them at a certain distance above the viewed item. Of course, if this is done for an extended period of time, such while reading a book or a newspaper, one's hands and arms will quickly tire. Also, if the user is using their hands to perform other tasks while viewing, such as typing or writing, the situation quickly becomes awkward and clumsy. These problems are not only limited to those with impaired vision, but to anyone who may use a portable magnifier at one time or another such as those viewing photographs with small levels of detail, those working on circuit boards with very small components, or anyone who works with items at a very small detail.

Those with impaired vision often rely on portable magnifiers to aid in one's viewing duties. While these magnifiers certainly work, they require the user to hold them at a certain distance above the viewed item. Of course, if this is done for an extended period of time, such while reading a book or a newspaper, one's hands and arms will quickly tire. Also, if the user is using their hands to perform other tasks while viewing, such as typing or writing, the situation quickly becomes awkward and clumsy. These problems are not only limited to those with impaired vision, but to anyone who may use a portable magnifier at one time or another such as those viewing photographs with small levels of detail, those working on circuit boards with very small components, or anyone who works with items at a very small detail.

Problem Solved

Accordingly, a need remains for a magnification screen for books, magazines and small articles and objects at a workstation. The present invention satisfies such a need by providing an apparatus that is simple and easy to use, is lightweight yet durable in design, and is easily secured to the pages of a book, magazine, written materials, artwork or other materials that require an apparatus that provides an easy means of reading fine print and, is perfect for use with legal documents, graphs, computer printouts, school texts, newspapers, magazines, books, and workstations with small objects. The apparatus is inexpensive, convenient and easy to store and transport. Accordingly, it is an object of the present invention to provide a holder for supporting an object or written material of photograph or book or the like in an opened position while providing room to work at the magnified object as a workstation or viewing area. It is also an object of the present invention to provide such a holder which is equally adapted to support a single sheet of paper containing written or printed matter thereon.

PRIOR ART

A novelty search was conducted to see what Hands-free adjustable magnifying lens holder and workstation, or the like were available. It is believed that this product is unique in its design and technologies. A novelty search revealed:
  A. U.S. Pat. No. 4,496,127 issued to Nelson in 1985 for an Adjustable book holder including magnifying front panel.
  B. U.S. Pat. No. 4,552,382 issued to Cowden in 1985 for a Bookholder with magnified viewing window.
  C. U.S. Pat. No. 6,574,051 issued to Powell in 2003 for a Portable reading magnifier.
  D. U.S. Pat. No. 7,304,809 issued to Budacz in 2007 for a Magnification screen for books, magazines and like bound literary works.
  E. U.S. Pat. No. 7,452,094 issued to Kroon, et al. in 2008 for a Magnification apparatus.
  F. US Patent Application No 20040150985 by Larocque in 2004 for a Magnifying and illuminating lectern or lectern adaptor.
  G. A Chinese patent No. CN101382650B issued to Lishan, et al. in 2011 for a Magnifier apparatus.
  H. A Chinese patent No. CN104765141A in 2018 issued to Lishan, et al. for a Portable magnifier.
  I. A Chinese patent CN204496101U issued to Lishan, et al. in 2015 for a Portable magnifier.

J. A Chinese patent CNI01762874B issued in 2012 to Lishan, et al. for a Portable magnifier device.

K. A Chinese patent CN204065552U issued in 2014 to Lishan, et al. for Portable magnifying lens and portable magnifying lens protective sleeve.

As can be observed, none of the prior art has anticipated or caused one skilled in magnifying devices and systems to realize or see this invention by McGarvey as obvious to a person skilled in the ordinary art of the industry. The Hands-free adjustable magnifying lens holder and workstation provides an answer to the problem of needing a simple, compact and easily adjustable magnifying device such as described here.

SUMMARY OF THE INVENTION

This invention is a Hands-free adjustable magnifying lens holder and workstation device for various applications. Taught here are the ways a Hands-free adjustable magnifying lens holder and workstation can be for use as various applications.

The preferred embodiment of the Hands-free adjustable magnifying lens holder and workstation device is comprised of: (a) a frame base of the hands-free adjustable magnifying lens holder and workstation with a pair of short pieces/members and a pair of long pieces/members, with a means for connecting short pieces to long pieces, with a liner sheet, and with a set of securement tabs fastened to frame base; (b) an end piece of support legs with a pair of side pieces, with an end piece, with a strap means for connecting side piece to end piece, with a connection means for connecting strap to side and end pieces with a series of slots for a pin for a means for connecting that fits into slot, and with a slot cover; (c) a means for connecting frame base to support legs; (d) a lens frame with the means for pivotally connecting the lens frame to the support legs, and with a slot for securing at least one lens; (e) a means for supporting the lens frame such as a telescopic structure from the set of securement tabs fastened to frame base; (f) a means for supporting the support legs such as a telescopic structure from the frame base; and (g) the at least one lens.

The newly invented Hands-free adjustable magnifying lens holder and workstation can be manufactured at low volumes by very simple means and in high volume production by more complex and controlled systems.

OBJECTS AND ADVANTAGES

There are several objects and advantages of the Hands-free adjustable magnifying lens holder and workstation device. There are currently no known Hands-free adjustable magnifying lens holder and workstation devices that are effective at providing the objects of this invention.

The Hands-free adjustable magnifying lens holder and workstation device has various advantages and benefits:

| Item | Advantages |
| --- | --- |
| 1 | Can magnifying objects with as a hands-free device |
| 2 | Is east to adjust to adjust heights and angle of lens |
| 3 | Can be collapsed to compact package |
| 4 | Can use multiple lens for increased magnification |
| 5 | Is light weight and easy to carry |
| 6 | Required no tools to adjust positions |
| 7 | Can be manufactured from available materials |

Finally, other advantages and additional features of the present Hands-free adjustable magnifying lens holder and workstation device will be more apparent from the accompanying drawings and from the full description of the device. For one skilled in the art of magnification devices and workstations, it is readily understood that the features shown in the examples with this product are readily adapted to other types of magnifying devices and systems.

DESCRIPTION OF THE DRAWINGS—FIGURES

The accompanying drawings, which are incorporated in and constitute a part of this specification, illustrate an embodiment of the Hands-free adjustable magnifying lens holder and workstation device for various applications device that is preferred. The drawings together with the summary description given above and a detailed description given below explain the principles of the magnifying lens holder and workstation. It is understood, however, that the magnifying device and workstation is not limited to only the precise arrangements and instrumentalities shown.

DESCRIPTION OF THE DRAWINGS—REFERENCE NUMERALS

The following list refers to the drawings:

TABLE B

| Ref # | Reference numbers<br>Description |
|---|---|
| 30 | Hands-free adjustable magnifying lens holder and workstation 30 |
| 31 | flat position design of Hands-free adjustable magnifying lens holder and workstation 31 |
| 33 | Raised position design of Hands-free adjustable magnifying lens holder and workstation 33 |
| 35 | Prototype 35 of Hands-free adjustable magnifying lens holder and workstation 30 |
| 36 | Means for connecting 36 frame base 37 to support legs 45 such as pivot bolt, screw, peg, dowel, etc. |
| 37 | Frame base 37 of Hands-free adjustable magnifying lens holder and workstation 30 |
| 37A | End or short pieces/members 37A of the frame base 37 |
| 37B | Side or long pieces/members 37B of the frame base 37 |
| 38 | Means for connecting 38 end pieces 37A to side pieces 37B such as threaded fasteners, screws, bolts, rivets, nails, pins, adhesive, epoxy, or molding or casting as one piece |
| 39 | Liner sheet 39 of frame base 37 such as thin cardboard, plywood, metal, or plastic sheet or the like |
| 40 | Securement tabs 40 fastened to frame base 37 such as ferrous metal pegs, screws, bolts, pins or the like |
| 45 | Support legs 45 constructed of metal, wood, plastic, composite material or the like |
| 45A | End piece 45A of support legs 45 |
| 45B | Side piece 45B of support legs 45 |
| 46 | Strap means for connecting 46 side piece 45B to end piece 45A such as flat angle, tee, straight strap, I strap, constructed of metal, plastic, composite material or the like |
| 47 | Connection means 47 for connecting strap 46 to side and end pieces 45A, 45B such as ferrous metal pegs, screws, bolts, pins, adhesive, glue, epoxy, or the like or molding or casting as one piece |
| 48 | Slots 48 to hold pins 65 of a means for pivotally connecting 61 lens holder frame 60 |
| 49 | Slot cover 49 constructed of wood, metal, plastic or composite materials |
| 49A | Pivot 49A for slot cover 49 such as pin, screw, bolt, rivet or the like |
| 50 | Means for supporting 50 the lens frame 60 such as a telescopic structure |
| 51 | Magnetic holding disk 51 at one end of the means for supporting 50 |
| 52 | Telescopic extension 57 of the means for supporting 50 |
| 53 | Means for securing 53 of the means for supporting 50 such as rubber sleeve, knurl, crosshatch or the like configured at the opposite end from the magnetic disk 51 |
| 55 | Means for supporting 55 the support legs 45 such as a telescopic structure |
| 56 | Magnetic holding disk 56 of the means for supporting 55 |
| 57 | Telescopic extension 57 of the means for supporting 55 |
| 58 | Means for securing 58 such as hinge pin, threaded fasteners, or rivet, etc. the of the means for supporting 55 to the support legs 45 |
| 59 | Block 59 secured to support legs 45 by glue, threaded fastener, nail or the like for means for securing 58 the means for supporting 55 the support legs 45 |
| 60 | Lens holder frame 60 comprised of a magnetically acceptable material (ferrous or ferrous alloy) |

TABLE B-continued

| Ref # | Reference numbers<br>Description |
|---|---|
| | for holding magnetic disk 51 of means to support 50 |
| 61 | Means for pivotally connecting 61 lens holder frame 60 to support legs 45 such as a block with a pin 65 |
| 62 | Aperture or open slot 62 in frame 60 for lens 70, 72 |
| 63 | Long/longitudinal sides/members 63 of frame 60 |
| 64 | End/cross piece or side/members 64 of frame 60 |
| 65 | Pin 65 for means 61 that fits into slot 48 |
| 70 | Lens No 1. 70 such as a flat magnifying glass sheet or a Fresnel magnifier sheet that consists of a flat plastic lens with concentric grooves that permits magnified viewing of a whole page |
| 72 | Lens No 2. 72 such as a flat magnifying glass sheet or a Fresnel magnifier sheet that consists of a flat plastic lens with concentric grooves that permits magnified viewing of a whole page |
| 90 | optional light 90 battery operated |
| 100 | Verse and written communication 100 |
| 101 | Calendar 101 |
| 102 | Inspirational verse and Bible passages 102 |
| 103 | Drug bottles, instructions, installation details, warnings, and how to 103 small letters/fine print |
| 104 | Painting and photographs 104 |
| 108 | Object 108 being worked upon by tool 109 |
| 109 | Tool 109 |
| 110 | Human work hands 110 |

DETAILED DESCRIPTION OF PREFERRED EMBODIMENT

The present development is a Hands-free adjustable magnifying lens holder and workstation device. Particularly this relates to stands used to support an object in an elevated, flat or angled position upon a table or other supporting surface and one that is easily adjustable to account for materials different thicknesses and which magnifies the object or space appearing upon the exposed area of the object or workspace. This invention relates generally to magnifying lenses and, more particularly, to a portable, free-standing magnifying lens particularly adapted for aiding in magnification with flat sheet lens. This magnifying lens holder and workstation device relates to magnification devices and, more particularly, to a magnification screen for books, photography, workstations and fine printed items for assisting a user to read text or see the detail of images at a workstation. Consequently, a need has been felt for providing an apparatus which provides portable magnification in a manner that can be used in a free-standing, non-hand-held manner. The applications anticipate original equipment with magnifying lens holder and workstation described and discussed below.

The advantages for the Hands-free adjustable magnifying lens holder and workstation device 30 are listed above in the introduction. Succinctly the benefits are that the device:
 A. Can magnifying objects with as a hands-free device
 B. Is east to adjust to adjust heights and angle of lens
 C. Can be collapsed to compact package
 D. Can use multiple lens for increased magnification
 E. Is light weight and easy to carry
 F. Required no tools to adjust positions
 G. Can be manufactured from available materials The preferred embodiment of the Hands-free adjustable magnifying lens holder and workstation device is comprised of: (a) a frame base 37 of the hands-free adjustable magnifying lens holder and workstation 30 with a pair of short pieces/members 37A and a pair of long pieces/members 37B, with a means for connecting 38 short pieces 37A to long pieces 37B, with a liner sheet 39, and with a set of securement tabs 40 fastened to frame base 37; (b) an end piece 45A of support legs 45 with a pair of side pieces 45B, with an end piece 45A, with a strap means for connecting 46 side piece 45B to end piece 45A, with a connection means 47 for connecting strap 46 to side and end pieces 45A, 45B, with a series of slots 48 for a pin 65 for a means for connecting 61 that fits into slot 48, and with a slot cover 49; (c) a means for connecting 36 frame base 37 to support legs 45; (d) a lens frame 60 with the means for pivotally connecting 61 the lens frame 60 to the support legs 45, and with a slot 62 for securing at least one lens 70,72; (e) a means for supporting 50 the lens frame 60 such as a telescopic structure from the set of securement tabs 40 fastened to frame base 37; (f) a means for supporting 55 the support legs 45 such as a telescopic structure from the frame base 37; and (g) the at least one lens 70,72.

There is shown in FIGS. 1-10 a complete description and operative embodiment of the Hands-free adjustable magnifying lens holder and workstation device 30. In the drawings and illustrations, one notes well that the FIGS. 1-10 demonstrate the general configuration and use of this product. The various example uses are in the operation and use section, below.

The accompanying drawings, which are incorporated in and constitute a part of this specification, illustrate an embodiment of the Hands-free adjustable magnifying lens holder and workstation device 30 that is preferred. The drawings together with the summary description given above and a detailed description given below explain the principles of the Hands-free adjustable magnifying lens holder and workstation device 30. It is understood, however, that the Hands-free adjustable magnifying lens holder and workstation device 30 is not limited to only the precise arrangements and instrumentalities shown. Other examples of magnifying devices and workstation devices and uses are still understood by one skilled in the art of magnification devices and systems to be within the scope and spirit shown here.

FIGS. 1A through 1D are sketches of the general adjustable magnifying lens holder and workstation device 30. Portrayed in these drawings are: a hands-free adjustable magnifying lens holder and workstation 30; a flat position design of hands-free adjustable magnifying lens holder and workstation 30; a raised position design of hands-free adjustable magnifying lens holder and workstation 33; and a prototype 35 of a hands-free adjustable magnifying lens holder and workstation 30.

FIGS. 2A through 2H are design sketches of the adjustable magnifying lens holder and workstation device 30 with many of the components and features noted. Demonstrated here in these sketches are: a hands-free adjustable magnifying lens holder and workstation 30; a flat position design of hands-free adjustable magnifying lens holder and workstation 31; a means for connecting 36 frame base 37 to support legs 45 such as pivot bolt, screw, peg, dowel, etc.; a frame base 37 of Hands-free adjustable magnifying lens holder and workstation 30; an end or short pieces/members 37A of the frame base 37; a side or long pieces/members 37B of the frame base 37; a means for connecting 38 end pieces 37A to side pieces 37B such as threaded fasteners, screws, bolts, rivets, nails, pins, adhesive, epoxy, or molding or casting as one piece; a set of securement tabs 40 fastened to frame base 37 such as ferrous metal pegs, screws, bolts, pins or the like; a structure of support legs 45 constructed of metal, wood, plastic, composite material or the like; an end piece 45A of support legs 45; a pair of side pieces 45B of support legs 45; a strap means for connecting 46 side piece 45B to end piece 45A such as flat angle, tee, straight strap, I strap, constructed of metal, plastic, composite material or the like; a connection means 47 for connecting strap 46 to side and end pieces 45A,45B such as ferrous metal pegs, screws, bolts, pins, adhesive, glue, epoxy, or the like or molding or casting as one piece; a series of slots 48 to hold pins 65 of means for pivotally connecting 61 lens holder frame 60; a slot cover 49 constructed of wood, metal, plastic or composite materials; a pivot 49A for slot cover 49 such as pin, screw, bolt, rivet or the like; a means for supporting 50 the lens frame 60 such as a telescopic structure; a magnetic holding disk 51 at one end of the means for supporting 50; a telescopic extension 57 of the means for supporting 50; a means for securing 53 of the means for supporting 50 such as rubber sleeve, knurl, cross-hatch or the like configured at the opposite end from the magnetic disk 51; a means for supporting 55 the support legs 45 such as a telescopic structure; a magnetic holding disk 56 of the means for supporting 55; a telescopic extension 57 of the means for supporting 55; a means for securing 58 such as hinge pin, threaded fasteners, or rivet, etc. the of the means for supporting 55 to the support legs 45; a block 59 secured to support legs 45 by glue, threaded fastener, nail or the like for means for securing 58 the means 55; a lens holder frame 60 comprised of a magnetically acceptable material (ferrous or ferrous alloy) for holding magnetic disk 51 of means to support 50; a means for pivotally connecting 61 lens holder frame 60 to support legs 45 such as a block with a pin 65; an aperture or open slot 62 in frame 60 for lens 70,72; a long/longitudinal sides/members 63 of frame 60; an end/cross piece or side/members 64 of frame 60; a pin 65 for pivotally connecting means 61 that fits into slot 48; a lens No 1. 70 such as a flat magnifying glass sheet or a Fresnel magnifier sheet that consists of a flat plastic lens with concentric grooves that permits magnified viewing of a whole page; and a lens No 2. 72 such as a flat magnifying glass sheet or a Fresnel magnifier sheet that consists of a flat plastic lens with concentric grooves that permits magnified viewing of a whole page.

FIGS. 3A through 3D are sketches of the adjustable magnifying lens holder and workstation 30 with the components and features shown from generally a top view and a side view in a flat and raised position. Provided in these drawings are: a hands-free adjustable magnifying lens holder and workstation 30; a flat position design of hands-free adjustable magnifying lens holder and workstation 31; a raised position design of hands-free adjustable magnifying lens holder and workstation 33; a means for connecting 36 frame base 37 to support legs 45 such as pivot bolt, screw, peg, dowel, etc.; a frame base 37 of Hands-free adjustable magnifying lens holder and workstation 30; an end or short pieces/members 37A of the frame base 37; a side or long pieces/members 37B of the frame base 37; a means for connecting 38 end pieces 37A to side pieces 37B such as threaded fasteners, screws, bolts, rivets, nails, pins, adhesive, epoxy, or molding or casting as one piece; a set of securement tabs 40 fastened to frame base 37 such as ferrous metal pegs, screws, bolts, pins or the like; a structure of support legs 45 constructed of metal, wood, plastic, composite material or the like; a strap means for connecting 46 side piece 45B to end piece 45A such as flat angle, tee, straight strap, I strap, constructed of metal, plastic, composite material or the like; a series of slots 48 to hold pins 65 of means for pivotally connecting 61 lens holder frame 60; a slot cover 49 constructed of wood, metal, plastic or composite materials; a pivot 49A for slot cover 49 such as pin, screw, bolt, rivet or the like; a means for supporting 50 the lens frame 60 such as a telescopic structure; a means for supporting 55 the support legs 45 such as a telescopic structure; a means for securing 58 such as hinge pin, threaded fasteners, or rivet, etc. the of the means for supporting 55 to the support legs 45; a block 59 secured to support legs 45 by glue, threaded fastener, nail or the like for means for securing 58 the means 55; a lens holder frame 60 comprised of a magnetically acceptable material (ferrous or ferrous alloy) for holding magnetic disk 51 of means to support 50; a means for pivotally connecting 61 lens holder frame 60 to support legs 45 such as a block with a pin 65; a lens No 1. 70 such as a flat magnifying glass sheet or a Fresnel magnifier sheet that consists of a flat plastic lens with concentric grooves that permits magnified viewing of a whole page; and a lens No 2. 72 such as a flat magnifying glass sheet or a Fresnel magnifier sheet that consists of a flat plastic lens with concentric grooves that permits magnified viewing of a whole page.

FIGS. 4A and 4E are sketches of the prototype 35 of an adjustable magnifying lens holder and workstation 30 in various positions with components and features shown. In these drawings are shown: a hands-free adjustable magnifying lens holder and workstation 30; a prototype 35 of a hands-free adjustable magnifying lens holder and workstation 30; a frame base 37 of Hands-free adjustable magnifying lens holder and workstation 30; an end or short pieces/members 37A of the frame base 37; a side or long pieces/members 37B of the frame base 37; a means for connecting 38 end pieces 37A to side pieces 37B such as threaded fasteners, screws, bolts, rivets, nails, pins, adhesive, epoxy, or molding or casting as one piece; a liner sheet 39 of frame base 37 such as thin cardboard, plywood, metal, or plastic sheet or the like; a set of securement tabs 40 fastened to frame base 37 such as ferrous metal pegs, screws, bolts, pins or the like; a structure of support legs 45 constructed of metal, wood, plastic, composite material or the like; a means for supporting 50 the lens frame 60 such as a telescopic structure; a means for supporting 55 the support legs 45 such as a telescopic structure; a lens holder frame 60 comprised of a magnetically acceptable material (ferrous or ferrous alloy) for holding magnetic disk 51 of means to support 50; a lens No 1. 70 such as a flat magnifying glass sheet or a Fresnel magnifier sheet that consists of a flat plastic lens with concentric grooves that permits magnified viewing of a whole page; and a lens No 2. 72 such as a flat magnifying glass sheet or a Fresnel magnifier sheet that consists of a flat plastic lens with concentric grooves that permits magnified viewing of a whole page.

FIGS. 5A through 5G are more sketches the prototype 35 of an adjustable magnifying lens holder and workstation 30 in various positions with components and features noted. Provided are: a hands-free adjustable magnifying lens holder and workstation 30; a prototype 35 of a hands-free adjustable magnifying lens holder and workstation 30; a frame base 37 of Hands-free adjustable magnifying lens holder and workstation 30; a means for connecting 38 end pieces 37A to side pieces 37B such as threaded fasteners, screws, bolts, rivets, nails, pins, adhesive, epoxy, or molding or casting as one piece; a liner sheet 39 of frame base 37 such as thin cardboard, plywood, metal, or plastic sheet or the like; a set of securement tabs 40 fastened to frame base 37 such as ferrous metal pegs, screws, bolts, pins or the like; a structure of support legs 45 constructed of metal, wood, plastic, composite material or the like; a strap means for connecting 46 side piece 45B to end piece 45A such as flat angle, tee, straight strap, I strap, constructed of metal, plastic, composite material or the like; a connection means 47 for connecting strap 46 to side and end pieces 45A,45B such as ferrous metal pegs, screws, bolts, pins, adhesive, glue, epoxy, or the like or molding or casting as one piece; a slot cover 49 constructed of wood, metal, plastic or composite materials; a pivot 49A for slot cover 49 such as pin, screw, bolt, rivet or the like; a means for supporting 50 the lens frame 60 such as a telescopic structure; a magnetic holding disk 51 at one end of the means for supporting 50; a telescopic extension 57 of the means for supporting 50; a means for securing 53 of the means for supporting 50 such as rubber sleeve, knurl, cross-hatch or the like configured at the opposite end from the magnetic disk 51; a means for supporting 55 the support legs 45 such as a telescopic structure; a means for securing 58 such as hinge pin, threaded fasteners, or rivet, etc. the of the means for supporting 55 to the support legs 45; a block 59 secured to support legs 45 by glue, threaded fastener, nail or the like for means for securing 58 the means 55; a lens holder frame 60 comprised of a magnetically acceptable material (ferrous or ferrous alloy) for holding magnetic disk 51 of means to support 50; a means for pivotally connecting 61 lens holder frame 60 to support legs 45 such as a block with a pin 65; a lens No 1. 70 such as a flat magnifying glass sheet or a Fresnel magnifier sheet that consists of a flat plastic lens with concentric grooves that permits magnified viewing of a whole page; a lens No 2. 72 such as a flat magnifying glass sheet or a Fresnel magnifier sheet that consists of a flat plastic lens with concentric grooves that permits magnified viewing of a whole page; optional light 90 battery operated; and a verse and written communication 100.

FIGS. 6A through 6F are even more sketches of the prototype 35 of an adjustable magnifying lens holder and workstation 30 in several positions with components and features shown. Configurations, parts and components portrayed here include: a hands-free adjustable magnifying lens holder and workstation 30; a prototype 35 of a hands-free adjustable magnifying lens holder and workstation 30; a means for connecting 36 frame base 37 to support legs 45 such as pivot bolt, screw, peg, dowel, etc.; a frame base 37 of Hands-free adjustable magnifying lens holder and workstation 30; an end or short pieces/members 37A of the frame base 37; a side or long pieces/members 37B of the frame base 37; a liner sheet 39 of frame base 37 such as thin cardboard, plywood, metal, or plastic sheet or the like; a set of securement tabs 40 fastened to frame base 37 such as ferrous metal pegs, screws, bolts, pins or the like; a structure of support legs 45 constructed of metal, wood, plastic, composite material or the like; a slot cover 49 constructed of wood, metal, plastic or composite materials; a means for supporting 50 the lens frame 60 such as a telescopic structure; a means for supporting 55 the support legs 45 such as a telescopic structure; a means for securing 58 such as hinge pin, threaded fasteners, or rivet, etc. the of the means for supporting 55 to the support legs 45; a block 59 secured to support legs 45 by glue, threaded fastener, nail or the like for means for securing 58 the means 55; a lens holder frame 60 comprised of a magnetically acceptable material (ferrous or ferrous alloy) for holding magnetic disk 51 of means to support 50; a lens No 1. 70 such as a flat magnifying glass sheet or a Fresnel magnifier sheet that consists of a flat plastic lens with concentric grooves that permits magnified viewing of a whole page; a lens No 2. 72 such as a flat magnifying glass sheet or a Fresnel magnifier sheet that consists of a flat plastic lens with concentric grooves that permits magnified viewing of a whole page; optional light 90 battery operated; a verse and written communication 100; and a painting and/or photographs 104.

FIGS. 7A through 7D are sketches of the prototype of the adjustable magnifying lens holder and workstation 30 with means for supporting the lens and support legs shown. These drawings feature: a hands-free adjustable magnifying lens holder and workstation 30; a prototype 35 of a hands-free adjustable magnifying lens holder and workstation 30; a means for connecting 36 frame base 37 to support legs 45 such as pivot bolt, screw, peg, dowel, etc.; a frame base 37 of Hands-free adjustable magnifying lens holder and workstation 30; an end or short pieces/members 37A of the frame base 37; a side or long pieces/members 37B of the frame base 37; a liner sheet 39 of frame base 37 such as thin cardboard, plywood, metal, or plastic sheet or the like; a set of securement tabs 40 fastened to frame base 37 such as ferrous metal pegs, screws, bolts, pins or the like; a structure of support legs 45 constructed of metal, wood, plastic, composite material or the like; a slot cover 49 constructed of wood, metal, plastic or composite materials; a pivot 49A for slot cover 49 such as pin, screw, bolt, rivet or the like; a means for supporting 50 the lens frame 60 such as a telescopic structure; a means for supporting 55 the support legs 45 such as a telescopic structure; a means for securing 58 such as hinge pin, threaded fasteners, or rivet, etc. the of the means for supporting 55 to the support legs 45; a block 59 secured to support legs 45 by glue, threaded fastener, nail or the like for means for securing 58 the means 55; a lens holder frame 60 comprised of a magnetically acceptable material (ferrous or ferrous alloy) for holding magnetic disk 51 of means to support 50; a lens No 1. 70 such as a flat magnifying glass sheet or a Fresnel magnifier sheet that consists of a flat plastic lens with concentric grooves that permits magnified viewing of a whole page; and a lens No 2. 72 such as a flat magnifying glass sheet or a Fresnel magnifier sheet that consists of a flat plastic lens with concentric grooves that permits magnified viewing of a whole page.

FIGS. 8A through 8I are sketches of the prototype 35 of the adjustable magnifying lens holder and workstation 30 showing the lens holder frame in various positions. Here are portrayed: a hands-free adjustable magnifying lens holder and workstation 30; a prototype 35 of a hands-free adjustable magnifying lens holder and workstation 30; a frame base 37 of Hands-free adjustable magnifying lens holder and workstation 30; a structure of support legs 45 constructed of metal, wood, plastic, composite material or the like; a strap means for connecting 46 side piece 45B to end piece 45A such as flat angle, tee, straight strap, I-shaped strap, constructed of metal, plastic, composite material or the like; a connection means 47 for connecting strap 46 to side and end pieces 45A,45B such as ferrous metal pegs, screws, bolts, pins, adhesive, glue, epoxy, or the like or molding or casting as one piece; a slot cover 49 constructed of wood, metal, plastic or composite materials; a means for supporting 50 the lens frame 60 such as a telescopic structure; a lens holder frame 60 comprised of a magnetically acceptable material (ferrous or ferrous alloy) for holding magnetic disk 51 of means to support 50; a means for pivotally connecting 61 lens holder frame 60 to support legs 45 such as a block with a pin 65; a pin 65 for means for pivotally connecting 61 that fits into slot 48; a lens No 1. 70 such as a flat magnifying glass sheet or a Fresnel magnifier sheet that consists of a flat plastic lens with concentric grooves that permits magnified viewing of a whole page; and a lens No 2. 72 such as a flat magnifying glass sheet or a Fresnel magnifier sheet that consists of a flat plastic lens with concentric grooves that permits magnified viewing of a whole page.

FIGS. 9A through 9E are sketches of the lens frame 60 and lens of the adjustable magnifying lens holder and workstation 30. Demonstrated in these views are: a lens holder frame 60 comprised of a magnetically acceptable material (ferrous or ferrous alloy) for holding magnetic disk 51 of means to support 50; a means for pivotally connecting 61 lens holder frame 60 to support legs 45 such as a block with a pin 65; an aperture or open slot 62 in frame 60 for lens 70,72; a long/longitudinal sides/members 63 of frame 60; an end/cross piece or side/members 64 of frame 60; a pin 65 for means for pivotally connecting 61 that fits into slot 48; a lens No 1. 70 such as a flat magnifying glass sheet or a Fresnel magnifier sheet that consists of a flat plastic lens with concentric grooves that permits magnified viewing of a whole page; and a lens No 2. 72 such as a flat magnifying glass sheet or a Fresnel magnifier sheet that consists of a flat plastic lens with concentric grooves that permits magnified viewing of a whole page.

Magnification is the process of enlarging the apparent size, not physical size, of something. This enlargement is quantified by a calculated number also called "magnification". Typically, magnification is related to scaling up visuals or images to be able to same more detail, increasing: resolution, using microscope, printing techniques, or digital processing. In all cases, the magnification of the image does not change the perspective of the image. A Fresnel magnifier or Fresnel magnifier sheet consists of a flat plastic lens with concentric grooves that permits magnified viewing of a whole page. The focal length of a Fresnel lens magnifier is about 4 inches from the object to be viewed. Fresnel page magnifiers are available as handheld, stand, desk, table, floor and magnifying lamps. For short term duration a handheld Fresnel magnifier is suitable but a hands-free Fresnel magnifier on stand is best for long term use. The Fresnel lens reduces the amount of material required compared to a conventional lens by dividing the lens into a set of concentric annular sections. An ideal Fresnel lens would have an infinite number of sections. In each section, the overall thickness is decreased compared to an equivalent simple lens. This effectively divides the continuous surface of a standard lens into a set of surfaces of the same curvature, with stepwise discontinuities between them. In some lenses, the curved surfaces are replaced with flat surfaces, with a different angle in each section. Such a lens can be regarded as an array of prisms arranged in a circular fashion, with steeper prisms on the edges, and a flat or slightly convex center. Fresnel lens design allows a substantial reduction in thickness (and thus mass and volume of material), at the expense of reducing the imaging quality of the lens, which is why precise imaging applications such as photography usually still use larger conventional lenses. Fresnel lenses are usually made of glass or plastic; their size varies from large (old historical lighthouses, meter size) to medium (book-reading aids, OHP viewgraph projectors) to small (TLR/SLR camera screens, micro-optics) In many cases they are very thin and flat, almost flexible, with thicknesses in the 1 to 5 mm (0.04 to 0.2 in) range.

Figure 1:
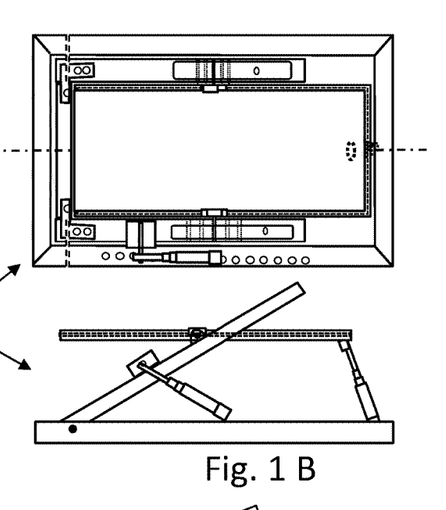
FIGS. 1A through 1D are sketches of the general adjustable magnifying lens holder and workstation device.
Figure 2:
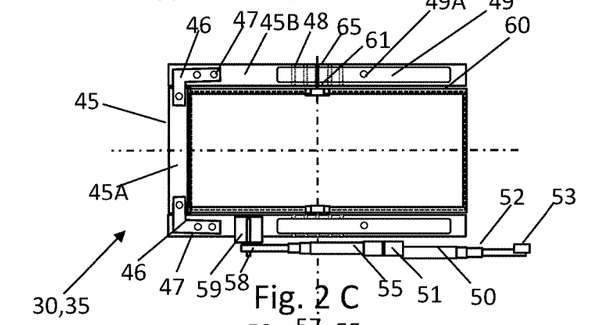
FIGS. 2A through 2H are design sketches of the adjustable magnifying lens holder and workstation device with components and features noted.
Figure 3A:
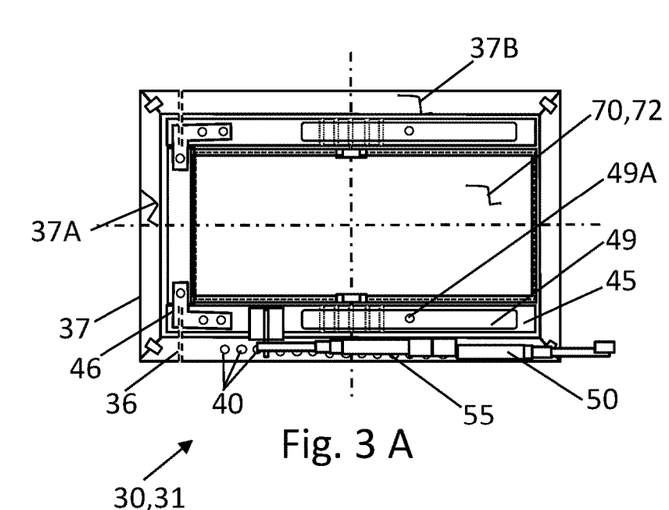
FIGS. 3A through 3D are sketches of the adjustable magnifying lens holder and workstation with the components and features shown from generally a top view and a side view in a flat and raised position.
Figure 3B:
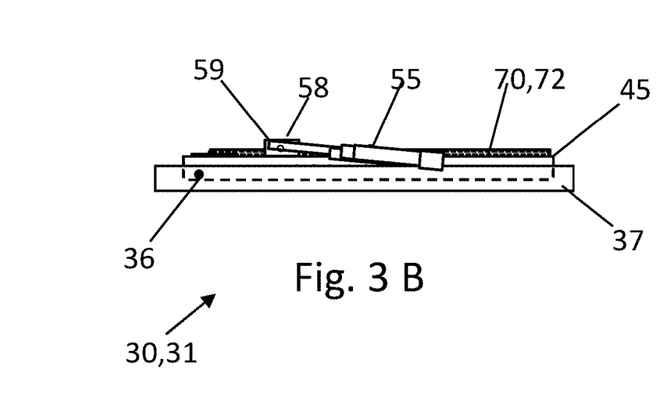
Figure 3C:
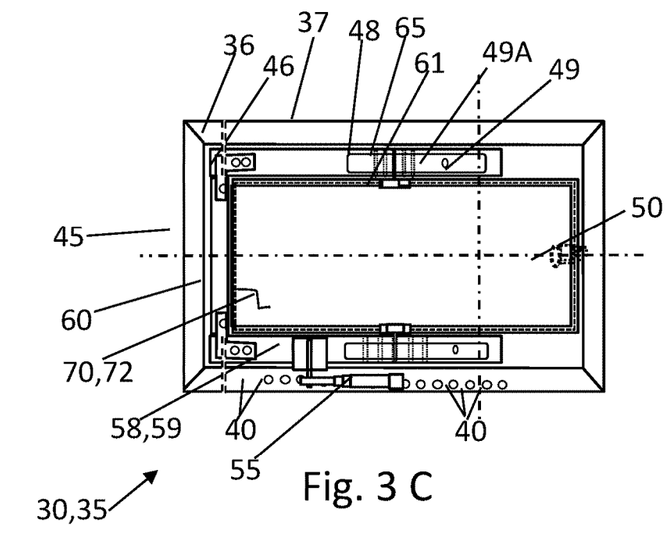
Figure 3D:
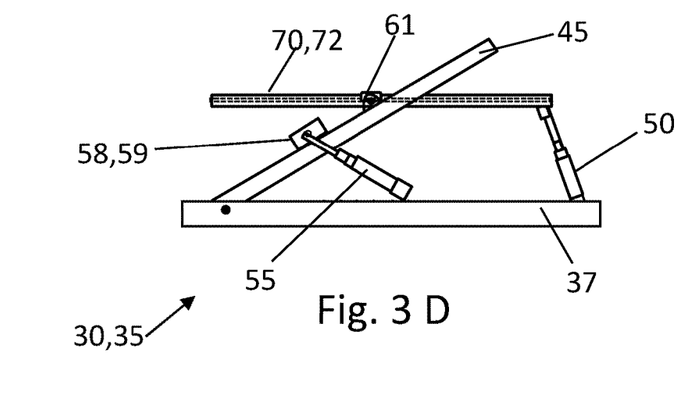
Figure 4:
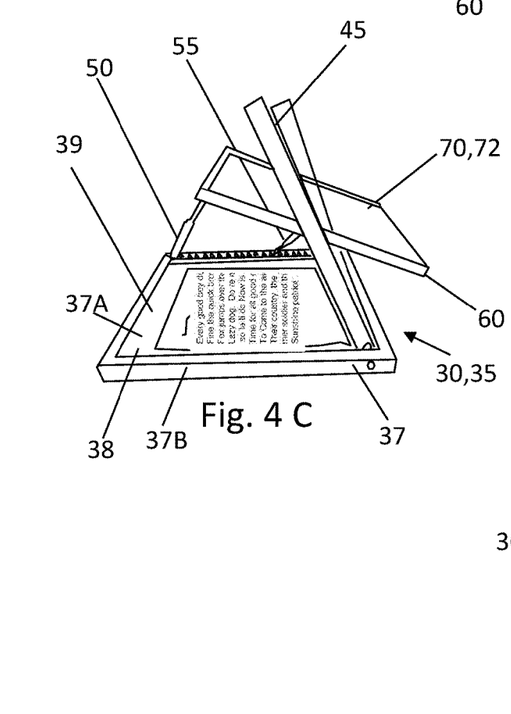
FIGS. 4A and 4E are sketches of the prototype of an adjustable magnifying lens holder and workstation in various positions with components and features shown.
Figure 5:
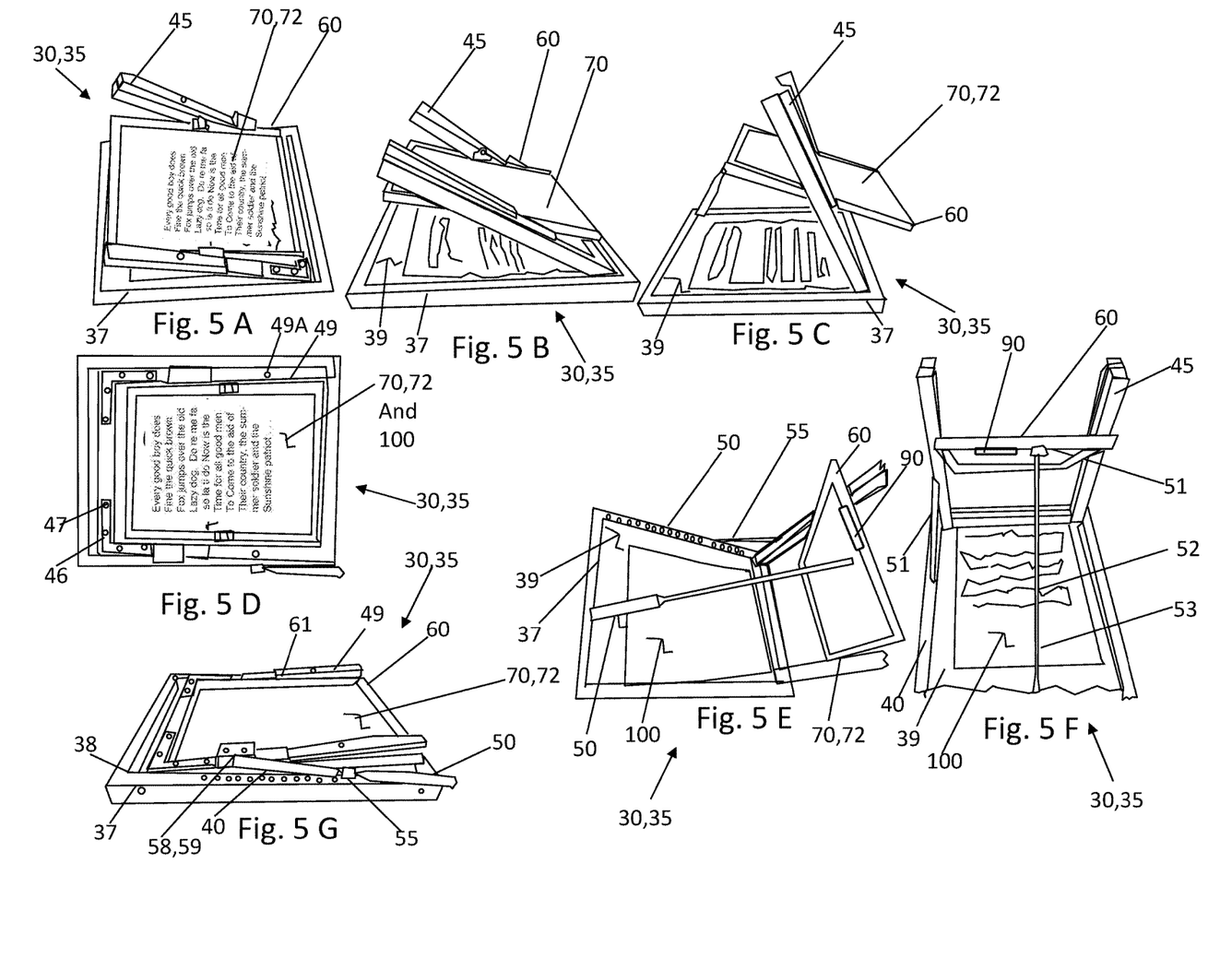
FIGS. 5A through 5G are more sketches the prototype of an adjustable magnifying lens holder and workstation in various positions with components and features noted.
Figure 6:
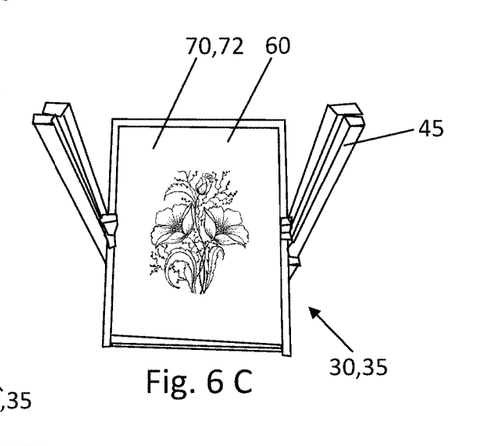
FIGS. 6A through 6F are even more sketches of the prototype of an adjustable magnifying lens holder and workstation in several positions with components and features shown.
Figure 7:
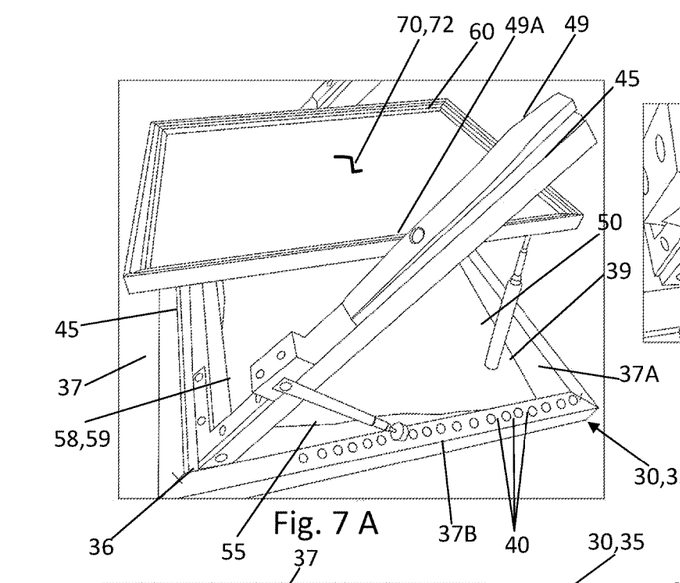
FIGS. 7A through 7D are sketches of the prototype of the adjustable magnifying lens holder and workstation with means for supporting the lens and support legs shown.
Figure 8:
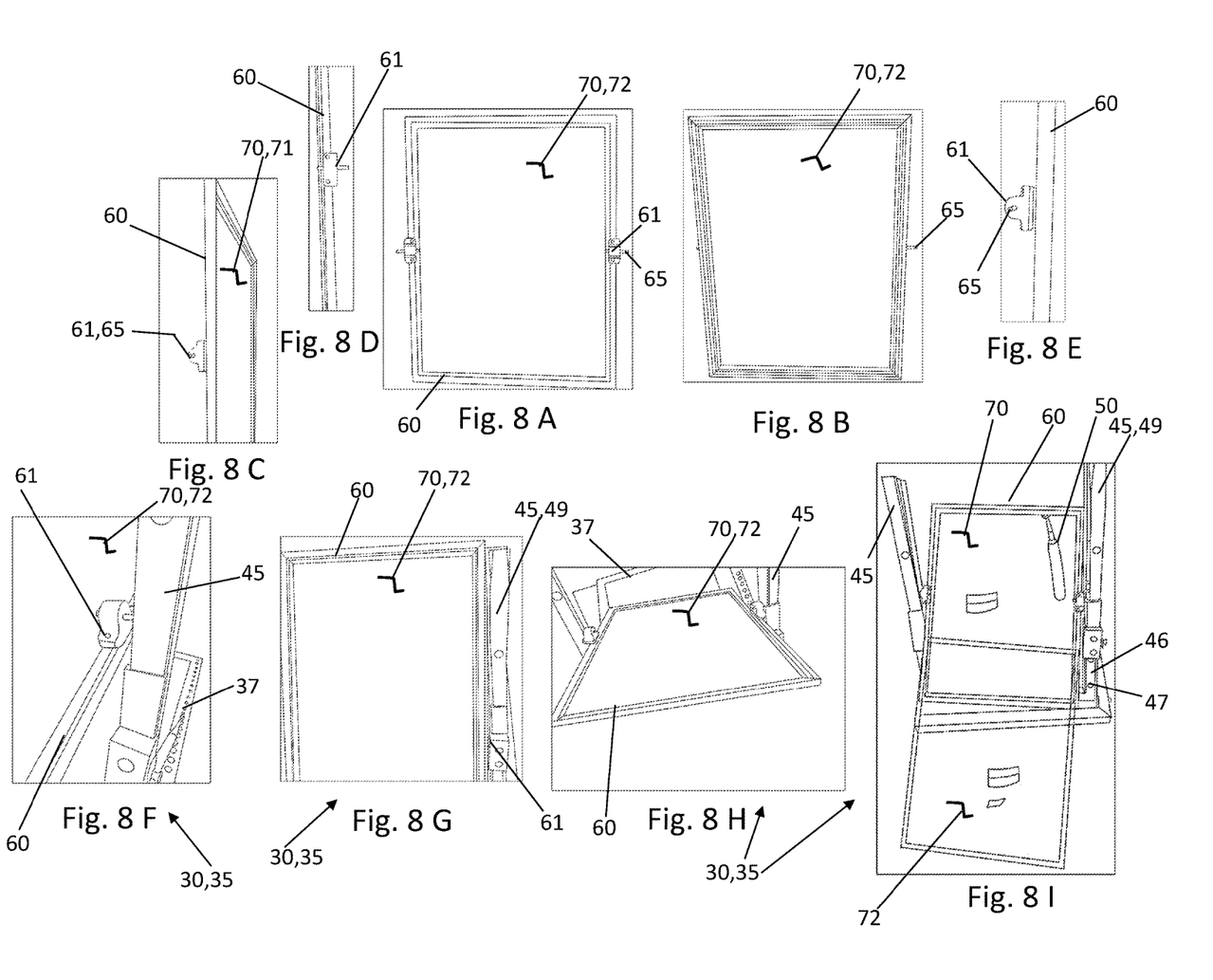
FIGS. 8A through 8I are sketches of the prototype of the adjustable magnifying lens holder and workstation showing the lens holder frame in various positions.
Figure 9:
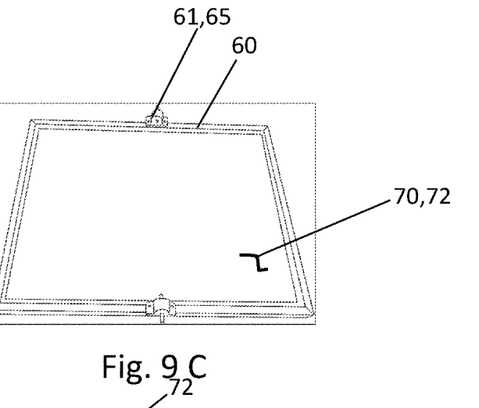
FIGS. 9A through 9E are sketches of the lens frame and lens of the adjustable magnifying lens holder and workstation.
Figure 10:
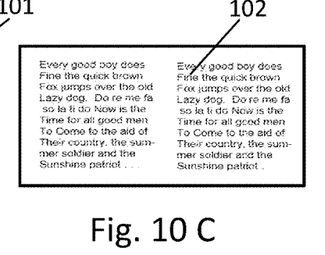
FIGS. 10A through 10H are sketches of the application items used with the adjustable magnifying lens holder and workstation.

FIGS. 10 A through 10H are sketches of the application items used with the adjustable magnifying lens holder and workstation. These are described in the below operation section.

The details mentioned here are exemplary and not limiting. Other specific components and manners specific to describing a Hands-free adjustable magnifying lens holder and workstation device 30 may be added as a person having ordinary skill in the field of the art of magnification devices and systems and their uses well appreciates.

Operation of the Preferred Embodiment

The Hands-free adjustable magnifying lens holder and workstation 30 has been described in the above embodiment. The manner of how the device operates is described below. One notes well that the description above and the operation described here must be taken together to fully illustrate the concept of the Hands-free adjustable magnifying lens holder and workstation 30. The preferred embodiment of the Hands-free adjustable magnifying lens holder and workstation device is comprised of: (a) a frame base 37 of the hands-free adjustable magnifying lens holder and workstation 30 with a pair of short pieces/members 37A and a pair of long pieces/members 37B, with a means for connecting 38 short pieces 37A to long pieces 37B, with a liner sheet 39, and with a set of securement tabs 40 fastened to frame base 37; (b) an end piece 45A of support legs 45 with a pair of side pieces 45B, with an end piece 45A, with a strap means for connecting 46 side piece 45B to end piece 45A, with a connection means 47 for connecting strap 46 to side and end pieces 45A, 45B, with a series of slots 48 for a pin 65 for a means for connecting 61 that fits into slot 48, and with a slot cover 49; (c) a means for connecting 36 frame base 37 to support legs 45; (d) a lens frame 60 with the means for pivotally connecting 61 the lens frame 60 to the support legs 45, and with a slot 62 for securing at least one lens 70,72; (e) a means for supporting 50 the lens frame 60 such as a telescopic structure from the set of securement tabs 40 fastened to frame base 37; (f) a means for supporting 55 the support legs 45 such as a telescopic structure from the frame base 37; and (g) the at least one lens 70,72.

The Hands-free adjustable magnifying lens holder and workstation device 30 operates by adjusting from the flat or compacted position 31 to a raised position 33. These raised positions can be at various angles to improve magnification and to provide more room for one's hands and objects being magnified. The frame base 37 and the support legs 45 pivot by the connecting means 36. The legs 45 can be placed at various angles and then the angle can be "removably fixed" by placing the support means 55 between the securement tabs 40 and the pivot position 58 and block 59. The means to connect 55 can be extended or shortened by the telescoping feature 57. Likewise, the securement tabs 40 are held by the magnetic head 56 of the means 55. The lens frame 60 holds the lens 70, 72 in the groove or aperture/slot 62. The frame 60 is pivotally held by the support legs 45 at the connection means 61 and pin 65. The pin 65 rests in one of the series of grooves 48 and is covered and secured by the slot cover 49. The lens frame 60 is removably secured by the means for supporting 50 which is placed between the magnetic lens frame 60 and the base frame 37. This support means 50 has a magnetic disk 51 at one end and a means for securing/rough surface 53 at the opposite end. The telescoping feature 52 permits the support 50 to be extended or shortened in order to set the angle of the lens frame 60 and base frame 37 at the desired angle yet firmly hold and support that desired configuration. Thereby the lens 70, 72 are held at a desired angle.

FIGS. 10A through 10H are sketches of the application items of a prototype 35 used with the adjustable magnifying lens holder and workstation 30. Demonstrated here are: a hands-free adjustable magnifying lens holder and workstation 30; a prototype 35 of a hands-free adjustable magnifying lens holder and workstation 30; a frame base 37 of Hands-free adjustable magnifying lens holder and workstation 30; a liner sheet 39 of frame base 37 such as thin cardboard, plywood, metal, or plastic sheet or the like; a structure of support legs 45 constructed of metal, wood, plastic, composite material or the like; a means for supporting 50 the lens frame 60 such as a telescopic structure; a lens holder frame 60 comprised of a magnetically acceptable material (ferrous or ferrous alloy) for holding magnetic disk 51 of means to support 50; a lens No 1. 70 such as a flat magnifying glass sheet or a Fresnel magnifier sheet that consists of a flat plastic lens with concentric grooves that permits magnified viewing of a whole page; a lens No 2. 72 such as a flat magnifying glass sheet or a Fresnel magnifier sheet that consists of a flat plastic lens with concentric grooves that permits magnified viewing of a whole page; a verse and written communication 100; a calendar 101; an inspirational verse and Bible passages 102; a group of drug bottles, instructions, installation details, warnings, and how to 103 small letters/fine print; a painting and/or photographs 104; an object 108 being worked upon by tool 109; a tool 109; and a person and human work hands 110.

Many uses for up-close handiwork and reading are anticipated for the Hands-free adjustable magnifying lens holder and workstation device 30. Some examples, and not limitations, are shown in the following Table.

| Item | Uses |
| --- | --- |
| 1 | Reading small print on books and pamphlets |
| 2 | Address and appointment calendar |
| 3 | Magnifies artwork—painting and photograph |
| 4 | Magnifier for using tools for close and fine work such as jewelry and electronics |
| 5 | Magnifying small print on contracts, pill containers, warnings, and contents |
| 6 | Magnifier instructions on small cans and tubes |
| 7 | Magnifier and revealer of brush strokes on artwork for security and inspection for forgeries and fraud |
| 8 | Frees up hands at a workstation while magnifying objects |
| 9 | Read stamps and coins for collectors |
| 10 | Detail painting for model builders and painting restorations |

With this description it is to be understood that the Hands-free adjustable magnifying lens holder and workstation device 30 is not to be limited to only the disclosed embodiment of product. The features of the Hands-free adjustable magnifying lens holder and workstation device 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and, in its operation, can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. Various features and aspects of the disclosed embodiments can be combined with or substituted for one another to form varying modes of the disclosed inventions. Thus, it is intended that the scope of at least some of the present inventions herein disclosed should not be limited by the particularly disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed considering the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

What is claimed is:

1. A hands-free adjustable magnifying lens holder and workstation (30) comprised of:
   (a) a frame base (37) of the hands-free adjustable magnifying lens holder and workstation (30) with a pair of short pieces/members (37A) and a pair of long pieces/members (37B), with a means for connecting (38) the pair of short pieces/members (37A) to the pair of long pieces/members (37B), with a liner sheet (39), and with a set of securement tabs (40) fastened to the frame base (37);
   (b) an end piece (45A) of a pair of support legs (45) with a pair of side pieces (45B) of the end piece (45A), with a strap means for connecting (46) the pair of side pieces (45B) to the end piece (45A), with a connection means (47) for a connecting strap (46) to the side and end pieces (45A, 45B) with a series of slots (48) for a pin (65) for a means for pivotally connecting (61) that fits into one of the series of slots (48), and with a slot cover(49);
   (c) a means for connecting (36) the frame base (37) to the pair of support legs (45);
   (d) a lens frame (60) with the means for pivotally connecting (61) the lens frame (60) to the pair of support legs (45), and with a slot (62) for securing at least one lens (70,72);
   (e) a means for supporting (50) the lens frame (60);
   (f) a means for securing (53) the means for supporting (50) at the opposite end from a magnetic disk (51);
   (g) a means for supporting (55) the pair of support legs (45);
   (h) a block (59) secured to the pair of support legs (45) and attached to the said block (59) is a means for securing (58) the means for supporting (55} the pair of support legs (45); and
   (i) the at least one lens (70,72)
   wherein the hands-free adjustable magnifying lens holder and workstation have uses for up-close handiwork and reading.

2. The hands-free adjustable magnifying lens holder and workstation (30) in claim 1 further comprised of a battery-operated light (90).

3. The hands-free adjustable magnifying lens holder and workstation (30) in claim 1 wherein the means for connecting (36) the frame base (37) to the pair of support legs (45) is selected from the group consisting of a pivot bolt, a screw, a peg, and a dowel.

4. The hands-free adjustable magnifying lens holder and workstation (30) in claim 1 wherein the means for connecting (38) the pair of short pieces/members (37A) to the pair of long pieces/members (37B) is selected from the group consisting of a threaded fastener, a screw, a bolt, a rivet, a nail, a pin, an adhesive, an epoxy, an integral molding as one piece and an integral casting as one piece.

5. The hands-free adjustable magnifying lens holder and workstation (30) in claim 1 wherein the liner sheet (39) is selected from the group consisting of a thin cardboard, a thin plywood, a sheet metal, and a plastic sheet.

6. The hands-free adjustable magnifying lens holder and workstation (30) in claim 1 wherein the material of the pair of support legs (45) is selected from the group consisting of metal, wood, plastic, and composite material.

7. The hands-free adjustable magnifying lens holder and workstation (30) in claim 1 wherein the set of securement tabs (40) is selected from the group consisting of ferrous metal pegs, screws, bolts, and pins.

8. The hands-free adjustable magnifying lens holder and workstation (30) in claim 1 wherein the connection means (47) for the connecting strap (46) to the pair of side and end pieces/members (45A, 45B) is selected from the group consisting of a ferrous metal peg, a ferrous screw, a ferrous bolt, and a ferrous pin, an adhesive, a glue, an epoxy, an integral molding as one piece and an integral casting as one piece.

9. The hands-free adjustable magnifying lens holder and workstation (30) in claim 1 wherein the means for supporting (50) the lens frame (60) is a telescopic structure from the set of securement tabs (40) fastened to frame base (37).

10. The hands-free adjustable magnifying lens holder and workstation (30) in claim 1 wherein the means for supporting (55) the pair of support legs (45) is a telescopic structure from the frame base (37).

11. The hands-free adjustable magnifying lens holder and workstation (30) in claim 1 wherein the means for securing (53) the means for supporting (50) at the opposite end from the magnetic disk (51) is selected from the group consisting of a rubber sleeve, a knurl, and a crosshatch.

12. The hands-free adjustable magnifying lens holder and workstation (30) in claim 1 wherein the means for securing the block to the support legs is selected from the group consisting of a glue, a threaded fastener, and a nail.

13. The hands-free adjustable magnifying lens holder and workstation (30) in claim 1 wherein the means for securing (58) the means for supporting (55} the pair of support legs (45) is selected from the group consisting of a hinge pin, a threaded fastener, and a rivet.

14. The hands-free adjustable magnifying lens holder and workstation (30) in claim 1 wherein the means for pivotally connecting (61) is a pin inserted into a slot.

15. The hands-free adjustable magnifying lens holder and workstation (30) in claim 1 wherein the uses are selected from the group consisting of reading small print on books and pamphlets, reading an address and appointment calendar, magnifying artwork, painting and photograph, magnifying tools for close and fine work such as jewelry and electronics, magnifying small print on contracts, pill containers, warnings, and contents of tubes, and magnifying instructions on small cans and tubes.

16. A hands-free adjustable magnifying lens holder and workstation (30) comprised of:
(a) a wood frame base (37) of the hands-free adjustable magnifying lens holder and workstation (30) with a pair of short pieces/members (37A) and a pair of long pieces/members (37B), with a set of nails connecting the pair of short pieces/members (37A) to long pieces/members (37B), with a cardboard liner sheet (39), and with a set of securement tabs (40) fastened to the frame base (37);
(b) an end piece (45A) of a pair of support legs (45) with a pair of side pieces (45B) of the end piece (45A), with a metal strap connecting the pair of side pieces (45B) to end piece (45A), with a screw connecting strap (46) to the side and end pieces (45A, 45B) with a series of slots (48) for a pin (65) for pivotally connecting (61) that fits into one of the series of slots (48), and with a slot cover(49);
(c) a set of screws connecting the frame base (37) to the pair of support legs (45);
(d) a metal lens frame (60) with the pin (61) connecting the lens frame (60) to the pair of support legs (45), and with a slot (62) for securing at least one lens (70,72);
(e) a means for supporting (50) the lens frame (60);
(f) a telescopic tube (55) for securing (53) the means for supporting (50) at the opposite end from a magnetic disk (51);
(g) a block (59) secured to the pair of support legs (45) and attached to the said block (59) is a means for securing (58) the means for supporting (55} the pair of support legs (45); and
(h) the at least one lens (70,72)
wherein the hands-free adjustable magnifying lens holder and workstation have uses for up-close handiwork and reading.

* * * * *